W. F. EASLEY.
LEMON JUICE EXTRACTOR.
APPLICATION FILED JUNE 10, 1908.

921,378.

Patented May 11, 1909.

WITNESSES
Edw. Thorpe
R. W. Hardie

INVENTOR
William F. Easley
BY Munn & Co.
ATTORNEYS

UNITED STATES PATENT OFFICE.

WILLIAM F. EASLEY, OF NEW YORK, N. Y.

LEMON-JUICE EXTRACTOR.

No. 921,378.  Specification of Letters Patent.  Patented May 11, 1909.

Application filed June 10, 1908. Serial No. 437,717.

*To all whom it may concern:*

Be it known that I, WILLIAM F. EASLEY, a citizen of the United States, and a resident of the city of New York, borough of Manhattan, in the county of New York and State of New York, have invented a new and Improved Lemon-Juice Extractor, of which the following is a full, clear, and exact description.

This invention relates to lemon juice extractors, and has for its object to provide means simple in construction, effective in operation and durable in use, and adapted to completely extract the juice from a lemon and separate said juice from the pulp and seeds of the lemon.

Other objects relating to the specific construction of the several features embodying my invention, will be understood from the following description and accompanying drawings, in which similar characters of reference indicate similar parts throughout the several views, and in which—

Figure 1:
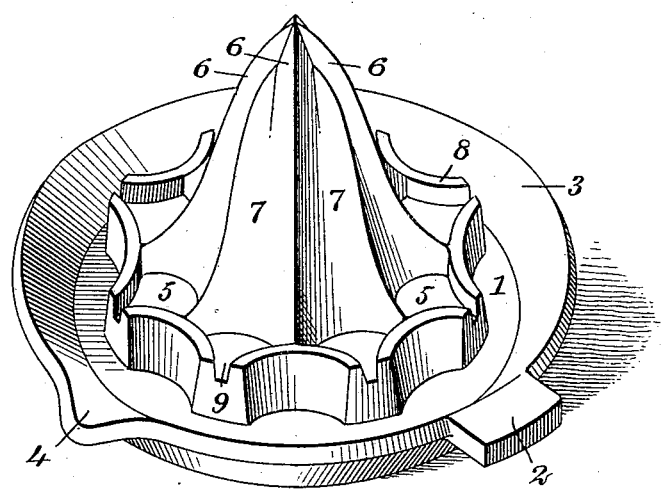
Figure 2:
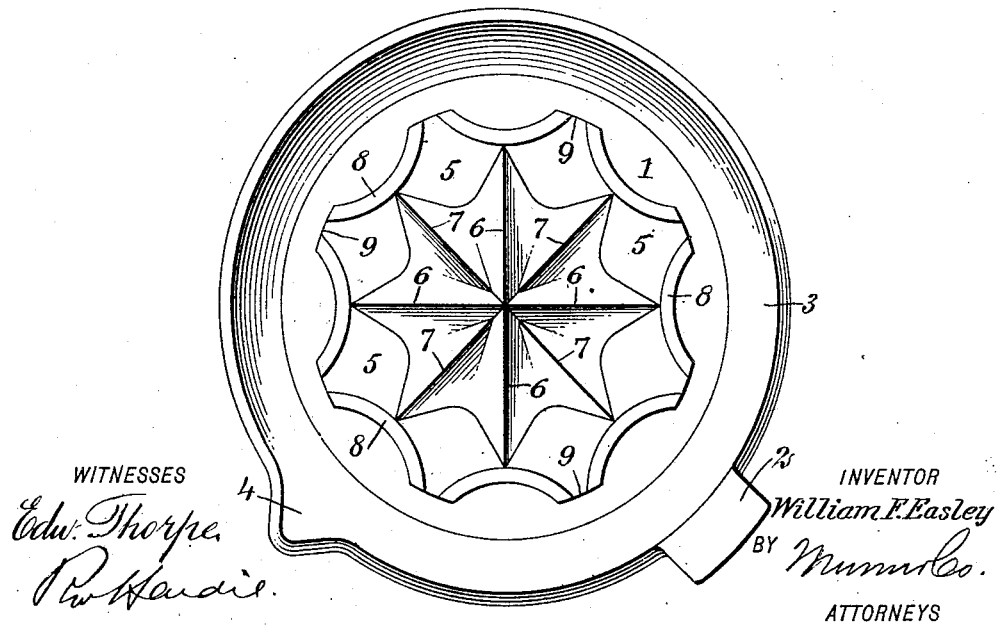

Figure 1 is a perspective view of a lemon juice extractor embodying my invention; and Fig. 2 is a plan of the device shown in Fig. 1.

As illustrated in Figs. 1 and 2 of the drawings, 1 represents a dish having a thumb piece 2 and a flaring flange 3 provided with a lip or discharge spout 4. A base 5 is formed on the bottom of the dish 1, with its surface arranged above the bottom of the dish so as to form a channel or receptacle between the outer walls of the base 5 and the inner wall of the flange 3, and for that purpose the outer wall of said base is spaced from the inner wall of the flange 3. A body extends upward from the base 5, conical in general outline and formed of blades 6 connected at their upper terminals. The side walls of each of these blades converge into an edge adapted for scraping purposes. Blades 7 are arranged alternately with the blades 6, and are preferably shorter than the last named blades so as to terminate at their upper extremities below the upper extremity of the blades. The side walls of the blades 6 and 7 converge into each other in curved lines, so as to form vertically inclined grooves curved in cross section. The blades 6 and 7 extend outward at their lower terminals and merge into the segmental flanges or barriers 8 formed on the base 5. The inner surface of these barriers is convex, and the end of each barrier is spaced from the end of an adjacent barrier so as to form discharge apertures 9 leading into the channel between the outer wall of the base 5 and the inner wall of the flange 3. The outer wall of the barriers 8 is preferably made concave.

The device is used by cutting a lemon in two and pressing the cut portions down onto the apex of the body and rotating the lemon on the body of the extractor. By making the alternate blades 7 of the extractor shorter than the blades 6, the upper portion of the body composed of the ribs 6 and 7 is enabled to enter the body of the lemon more readily and effectively than if all of the blades extended to the apex of the body. The scraping edge of the blades 6 and 7 being curved outwardly at their lower portion, operates more effectively on the lower portion of the lemon than blades of a similar character extending directly downwardly to the base of the extractor. As the lemon is rotated on the body of the extractor, the juice is squeezed from the lemon and flows down the sides of the blades 6 and 7 and into the receptacles formed by the lower portion of said blades and the barriers 8, and thence flows through the discharge apertures 9 into the channel between the outer wall of the base 5 and the inner wall of the flange 3. The barriers 8, however, hold back any seeds and pulp that may come from the lemon and prevent said seeds and pulp from entering said channel. By tilting the device the juice may be poured out through the spout or lip 4 at the same time retaining the pulp and seeds within the pockets formed by the barriers 8. By extending the lower portion of the blades 6 and 7 outward to the barriers 8, the barriers themselves are thereby strengthened and the pockets are entirely separated from each other, with one discharge aperture 9 for each pocket. The inner convex wall of the barriers 8 permits the juice to flow readily out through the discharge aperture 9, and the surface of the base 5 is preferably inclined from the base of the blades 6 and 7 to said aperture 9, so as to enable the juice to readily flow out of the pocket into the channel adjacent to the outer wall of the base 5. By making the outer wall of the barriers 8 concave in outline, ample space is provided for the juice in the channel formed by the outer wall of the base and the flaring flange 3, at the same time forming pockets and projections in the outer wall of the base 5, so that if any seeds or pulp should by chance overflow from the pockets of the body of the device, said pulp or seeds would be in a large measure retained by the projection of the pockets of said channel and prevent the seeds and pulp from being poured out of the dish with the juice.

Having thus described my invention, what I claim as new and desire to secure by Letters Patent is:

1. A lemon juice extractor having a flaring flange extending upward from the bottom of the extractor to form a channel or receptacle, a base having its upper surface arranged above the bottom of said channel or receptacle, a body extending upwardly from said base and having vertically inclined blades, and barriers formed on the outer portion of said base connected with the lower portion of said blades and separated from each other so as to form independent pockets on said base having discharge apertures leading therefrom.

2. A lemon juice extractor having a flaring flange extending upward from the bottom of the device forming an annular channel or receptacle, a base having its upper surface arranged above the bottom of said channel or receptacle, a body extending upward from said base, comprising vertically inclined blades, and curved barriers formed on said base having their convex wall connected with the lower portion of said blade, said barriers being spaced from each other so as to form independent pockets, and apertures leading from said pockets into said channel or receptacle.

3. A lemon juice extractor comprising a dish having an annular channel or receptacle, a base having its upper surface arranged above the lower portion of said channel or receptacle, a body, comprising vertically inclined blades extending upwardly from the surface of said base, curved barriers extending upward from the surface of said base having an inner convex wall connected with the lower portion of said blades so as to form pockets independent of each other, said barriers being spaced from each other to form discharge apertures leading from said pockets to said channel or receptacle, and provided with concave outer walls.

In testimony whereof I have signed my name to this specification in the presence of two subscribing witnesses.

WILLIAM F. EASLEY.

Witnesses:
ROBERT W. HARDIE,
JOHN P. DAVIS.